(12) United States Patent
Maeda et al.

(10) Patent No.: US 7,488,557 B2
(45) Date of Patent: Feb. 10, 2009

(54) ELECTRODE FOR LEAD-ACID BATTERY

(75) Inventors: Akihiro Maeda, Fujisawa (JP); Naoto Hoshihara, Shizuoka (JP); Junji Nakajima, Osaka (JP)

(73) Assignee: Panasonic Corporation, Osaka (JP)

(*) Notice: Subject to any disclaimer, the term of this patent is extended or adjusted under 35 U.S.C. 154(b) by 810 days.

(21) Appl. No.: 10/475,328

(22) PCT Filed: Dec. 24, 2002

(86) PCT No.: PCT/JP02/13456

§ 371 (c)(1),
(2), (4) Date: Oct. 21, 2003

(87) PCT Pub. No.: WO03/065482

PCT Pub. Date: Aug. 7, 2003

(65) Prior Publication Data

US 2004/0115530 A1 Jun. 17, 2004

(30) Foreign Application Priority Data

Jan. 30, 2002 (JP) ............................. 2002-021450

(51) Int. Cl.
*H01M 4/62* (2006.01)
*H01M 4/74* (2006.01)
*H01M 4/56* (2006.01)

(52) U.S. Cl. ...................... 429/217; 429/225; 429/233; 429/242

(58) Field of Classification Search ................ 429/209, 429/212–217, 228, 225–226, 233–236, 218.1
See application file for complete search history.

(56) References Cited

U.S. PATENT DOCUMENTS

| | | | | |
|---|---|---|---|---|
| 3,615,831 A | * | 10/1971 | Ruben | 429/204 |
| 4,136,235 A | * | 1/1979 | de Nora et al. | 429/204 |
| 4,232,100 A | * | 11/1980 | Magnusson et al. | 429/217 |
| 4,548,835 A | | 10/1985 | Takahashi et al. | |
| 4,589,999 A | * | 5/1986 | Vasta | 252/511 |
| 5,221,587 A | * | 6/1993 | Bohnstedt et al. | 429/145 |

FOREIGN PATENT DOCUMENTS

| | | |
|---|---|---|
| EP | 70718 | 1/1983 |
| JP | 55-46267 | 3/1980 |
| JP | 56-24762 | 3/1981 |
| JP | 60-101867 | 6/1985 |
| JP | 02-168555 | 6/1990 |
| JP | 04-264360 | 9/1992 |
| JP | 04264360 A * | 9/1992 |
| JP | 04-363872 | 12/1992 |
| JP | 11001676 A * | 1/1999 |
| JP | 11097026 A * | 4/1999 |

* cited by examiner

*Primary Examiner*—Patrick Ryan
*Assistant Examiner*—Keith Walker
(74) *Attorney, Agent, or Firm*—McDermott Will & Emery LLP

(57) ABSTRACT

The present invention relates to a lead-acid battery Comprising a positive and a negative electrode, each having a current collector comprising an expanded grid, characterized in that at least one of the positive electrode and the negative electrode contains an organic binder in an active material layer at an edge portion thereof.

This makes it possible to suppress an internal short circuit resulting from the separation or abnormal growth of an active material due to repeated charge/discharge, thereby remarkably prolonging the cycle life of a lead-acid battery.

9 Claims, 4 Drawing Sheets

ELECTRODE FOR LEAD-ACID BATTERY

TECHNICAL FIELD

The present invention relates to a lead-acid battery comprising an electrode using an expanded grid as a current collector. The present invention further relates to suppressing an internal short circuit resulting from the separation or abnormal growth of an active material, thereby prolonging the cycle life of a lead-acid battery.

BACKGROUND ART

In order to obtain a higher capacity lead-acid battery and to facilitate the production process of the lead-acid battery, an expanded grid is mostly used these days because an expanded grid can be made thinner than a conventional grid obtained by casting and it can be serially produced.

In a lead-acid battery, the volume change of the active material during charging/discharging is relatively large. Accordingly, the repetition of charging and discharging weakens the binding force within the active material, making it easier for the active material to separate from the electrode.

In the case where the current collector is a casting grid, it is easy to form a rigid frame around the electrode. The volume change of the active material can be suppressed to a certain degree by filling the inside of the frame with an active material; accordingly, the separation of the active material can be prevented.

In the case where the current collector is an expanded grid, on the other hand, unlike the case of a casting grid, it is difficult to form a frame around the electrode because of its production method. Therefore, the active material filling the grid at the right and left edge portions of the electrode is not surrounded by a frame. As shown in FIGS. 1 and 2 which will be used in examples described hereinafter, in a negative electrode 5 comprising an expanded grid 1 and an active material layer 2, the active material layer 2 is exposed outside at the right and left portions of the electrode. Thus, the active material at these portions of the electrode is likely to separate from the electrode due to the volume change of the active material during charging/discharging. The separated active material deposits on the lower portion of the electrode, which is a cause of short circuit between the positive and negative electrodes. This internal short circuit degrades the battery characteristics.

In a valve regulated lead-acid battery, there are cases where the active material grows abnormally at the right and left edge portions of the negative electrode during the repetition of charging and discharging. The problem arises that the active material grows and reaches the positive electrode, causing an internal short circuit.

A valve regulated lead-acid battery has a system of reducing an oxygen gas generated at the positive electrode into water at the negative electrode during charging, which prevents the electrolyte from going away outside the system. This system is a cause of the abnormal growth of the active material.

First, oxygen gas generated at the positive electrode reaches the surface of the negative electrode and is reduced to water by metallic lead of the negative electrode. Meanwhile, the metallic lead of the negative electrode which has reduced the oxygen gas is oxidized to a lead oxide. Subsequently, the lead oxide is dissolved in the electrolyte and is reacted with sulfuric acid to give lead sulfate. The lead sulfate is reduced to metallic lead by receiving electrons at the negative electrode.

When the oxygen gas is reduced, metallic lead is required to have a solid-gaseous interface because metallic lead causes solid-gaseous phase reaction with the oxygen gas. Further, the produced lead oxide is reduced to lead sulfate and then to metallic lead; thereby, it is possible to continuously cause the reduction reaction with the oxygen gas. Accordingly, it is of importance that the metallic lead also has a solid-liquid interface.

In view of the above, it is considered that the area where the oxygen gas is efficiently reduced into water is the right and left edge portions of the negative electrode having larger three-phase interfaces (solid, liquid, gas). Accordingly, an apparent charge and discharge reaction occurs more at the right and left edge portions of the negative electrode than other portions; inevitably, the volume change of the active material is significant at the edge portions, making it easier for the active material to separate.

Moreover, since the reduction reaction of the oxygen gas is a reaction that accompanies dissolution and deposition, the shape of the active material changes significantly. Therefore, the abnormal growth of metallic lead is likely to occur at the right and left edge portions of the negative electrode.

In order to solve the above problems, for example, Japanese Patent No. 2742804 proposes a method in which a positive electrode plate is encased in a bag-shaped or U-shaped mat separator composed mainly of glass fiber and a negative electrode plate is encased in a bag-shaped separator made of polymer resin.

Further, Japanese Patent No. 3146438 proposes a method to prevent the separation of an active material and an internal short circuit by filling the space between positive and negative electrode plates and the periphery of the electrode plates with powdered silica.

According to the method described in Japanese Patent No. 2742804, a separated active material can be maintained at a certain position, and an internal short circuit resulting from the separation of an active material can be sufficiently prevented. However, in order to ensure the mechanical strength of a separator made of polymer resin in the process to form the separator into a bag shape, the separator is required to have a certain thickness. If such separator made of polymer resin is interposed between the positive electrode and the negative electrode, the space between the positive electrode and the negative electrode will be widened. This increases the resistance of electrolyte, which degrades the output characteristics of the battery. What is worse is that this method cannot prevent the separation of the active material itself. Thus, as charging and discharging are repeated, the amount of the active material not involved in charging and discharging increases, which decreases the battery capacity.

Moreover, according to a method described in Japanese Patent No. 3146438, it is difficult to efficiently fill a battery container with powdered silica, and a significant effect cannot be expected. What is worse is that the permeation of an oxygen gas or the like generated during charging is inhibited. Therfore, it is possible that the reduction reaction of an oxygen gas is inhibited, which causes the electrolyte depletion.

Furthermore, since the above two methods use a large amount of polymer resin or powdered silica which is not involved in charging/discharging, the space equal to the volume of polymer resin or powdered silica is wasteful and the amount of the active material useful for charging/discharging is reduced.

In order to solve the above problem, it is an object of the present invention to suppress an internal short circuit resulting from the separation or abnormal growth of an active material, thereby providing a lead-acid battery with longer life.

DISCLOSURE OF INVENTION

The present invention relates to a lead-acid battery comprising a positive electrode and a negative electrode, each having a current collector comprising an expanded grid, characterized in that at least one of the positive electrode and the negative electrode contains an organic binder in an active material layer at an edge portion thereof.

The organic binder preferably has resistance to acids.

The organic binder preferably has resistance to acids and the ability to form a film.

The organic binder preferably comprises a resin containing butyl rubber.

The butyl rubber preferably contains butyl isocyanate.

The organic binder preferably comprises butyl rubber and styrene rubber.

The present invention further relates to a lead-acid battery comprising a positive electrode and a negative electrode, each having a current collector comprising an expanded grid, characterized in that at least one of the positive electrode and the negative electrode has a porous resin layer formed on the surface of an active material layer at an edge portion thereof.

The porous resin layer preferably comprises butyl rubber.

The butyl rubber preferably contains butyl isocyanate.

The porous resin layer preferably comprises butyl rubber and styrene rubber.

BEST MODE FOR CARRYING OUT THE INVENTION

The present invention is a lead-acid battery comprising a positive electrode and a negative electrode, each having a current collector comprising an expanded grid, characterized in that at least one of the positive electrode and the negative electrode contains an organic binder in an active material layer at an edge portion thereof.

Figure 1:
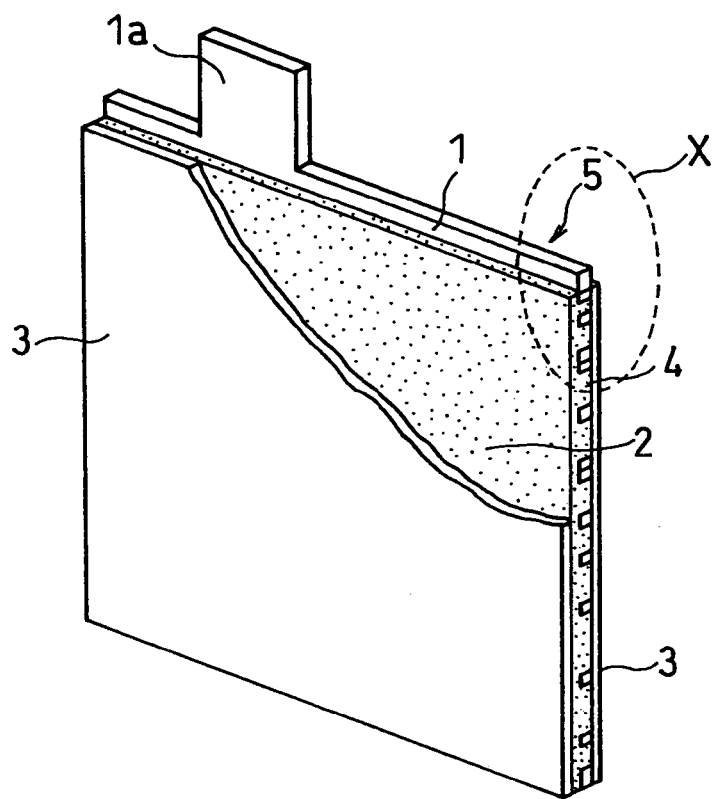
FIG. 1 is a perspective view of a (conventional) negative electrode before impregnation of an organic binder.
Figure 2:
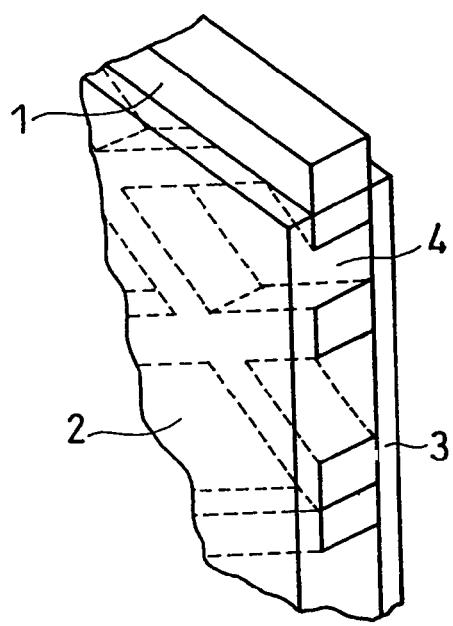
FIG. 2 is an enlarged perspective view of the portion "X" shown in FIG. 1.

Herein, FIG. 1 is a perspective view of a conventional negative electrode. As shown in FIG. 1, the conventional negative electrode comprises an expanded grid 1 with a lug portion 1a and an active material layer 2 filling the expanded grid 1. On each side face of the negative electrode is attached a sheet of paste paper 3. FIG. 2 is an enlarged view of the portion "X" shown in FIG. 1. The conventional negative electrode has the problem that an active material could separate from the edge portion 4 thereof because the expanded grid 1 is not surrounded by a frame and the active material layer 2 is exposed at the edge portion 4, as is apparent from FIGS. 1 and 2.

Figure 3:
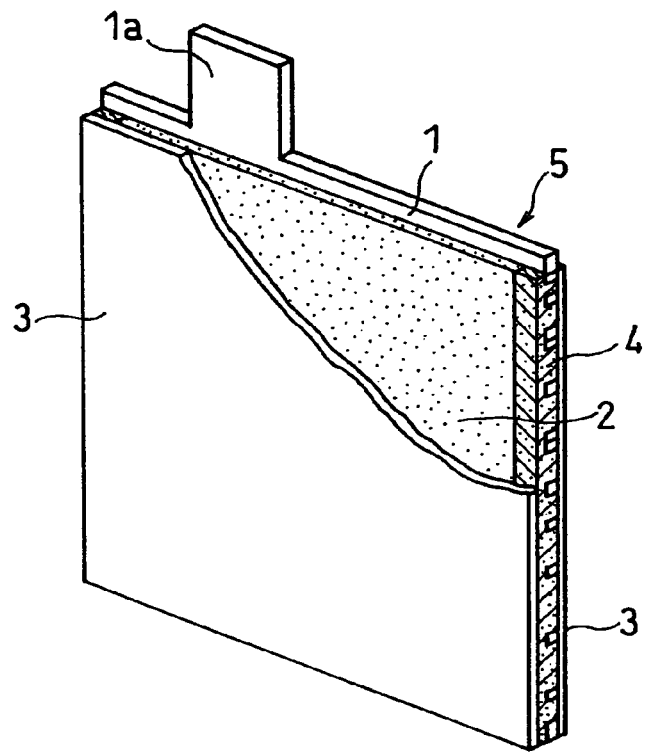
FIG. 3 is a perspective view of a negative electrode with an organic binder impregnated therein.

Accordingly, the present invention is characterized in that the edge portion 4 of the active material layer 2, which is exposed because of the absence of a frame at the edge of the expanded grid 1, contains an organic binder, as shown in FIG. 3.

It should be noted that the organic binder in accordance with the present invention is a material with binding property comprising at least one organic compound, or a binder comprising at least one organic compound.

The separation of the active material can be prevented since the organic binder contained in the active material layer at the edge portion of the electrode maintains its binding force within the active material whose volume changes during charging/discharging. It is preferred that the lower edge portion also contains the organic binder in order to insulate the electrode from separated active material.

Additionally, the above-described effect can be achieved if at least, the periphery of the surface of the active material layer at the edge portion of the electrode contains the organic binder. It is more preferred that the whole active material layer contains the organic binder because that can further strengthen the binding force within the active material.

It is also preferred that the organic binder has resistance to acids. When the organic binder is used in a lead-acid battery, stable binding force can be maintained for a long period of time.

It is further preferred that the organic binder has the ability to form a film. Covering the active material with a much less reactive film suppresses the charging/discharging reaction at the covered portion. This reduces the volume change of the active material resulting from the charging/discharging reaction, making it easy to maintain the binding force within the active material.

The organic binder film may be formed not only on the surface of the active material at the edge portion of the electrode, but also on the expanded grid itself. In such a case, the effect of insulating the electrode from separated active material enhances.

It is preferred that the above-mentioned organic binder comprises a resin containing butyl rubber. Since butyl rubber is tough and flexible, it is easy to maintain the binding force even if the volume of the active material changes.

The components of butyl rubber include isobutylene and butyl isocyanate, etc. They may be used singly or in combination. Among them, butyl isocyanate is more preferred. Butyl isocyanate forms a three-dimensional crosslinked structure by a urea bonding and a biuret bonding; thereby, a tough and flexible resin can be formed.

It is also possible to further increase flexibility and toughness by mixing butyl rubber and styrene rubber.

Although toluene is typically used as the solvent dissolving the mixture of butyl rubber and styrene rubber, the use of xylene or other solvent capable of dissolving the aforesaid organic binder components gives a similar result. The use of their mixture also gives a similar result.

Further, the present invention is related to a lead-acid battery comprising a positive electrode and a negative electrode, each having a current collector comprising an expanded grid, characterized in that at least one of the positive electrode and the negative electrode has a porous resin layer formed on the surface of an active material layer at an edge portion thereof. There is no need to mention that the porous resin layer may cover the edge of the expanded grid.

The porous resin layer maintains the binding force within the active material of the electrode at the edge portion thereof; thereby, the separation of the active material can be prevented and the internal short circuit which occurs due to separated active material can be prevented. Herein, the porous resin layer is a porous body with through holes. Thus, it enables the permeation of oxygen gas generated during charging without impeding the diffusion of electrolyte; furthermore, the diffusion of oxygen gas is not impeded.

A similar effect can be obtained even when the porous resin layer having through holes covers not only the surface of the active material layer but also the periphery of the surface of the active material layer.

It is preferred that the porous resin layer comprises butyl rubber. Since butyl rubber is superior in resistance to acids, the initial performance can be maintained for a long period of time.

It is preferred that the butyl rubber contains butyl isocyanate. Since butyl isocyanate forms a three-dimensional crosslinked structure when it is cured, the active material can be securely retained. Further, since butyl isocyanate is superior in resistance to acids, the effect can last for a long time.

It is preferred that the porous resin layer comprises the mixture of butyl rubber and styrene rubber. Because the use of the mixture increases the flexibility compared to the case of using butyl rubber only, it is possible to respond more flexibly to the volume change of the active material.

The porous layer in the porous resin layer can be formed by using a foaming agent.

In the case where a thermal decomposition type foaming agent is added to butyl rubber, for example, part of the component obtained by decomposition during heating of a thermal decomposition type foaming agent supports the three-dimensional crosslinked structure of the butyl rubber. The remaining of the decomposed component includes a gas and a polymeric residue. Foam is formed within the resin layer by the gas component, and the foam is connected to form through holes. After through holes are formed, the gas generated is removed with the solvent. Accordingly, the gas hardly remains in the porous resin layer as an impurity.

On the other hand, although the polymeric residue remains in the resin layer, there is a method to effectively employ it. For example, when hydrophilicity is imparted to the porous resin layer, a foaming agent for allowing sulfone group to remain as a residual substituent should be selected.

Preferred thermal decomposition type foaming agent include azodicarbonamide, dinitrosopenta-methylene-tetramine, 4,4'-oxybis benzene sulfonyl hydrazide, etc. There are many other foaming agents which have different foaming temperature and different decomposed products because of the differences in structure, molecular weight, substituent, etc. Accordingly, it is possible to adjust the porosity, diameter, thickness and size of resin skeleton of the porous resin layer. They can be used optionally according to the purpose, or they can be used in combination of two or more.

The porosity of the porous resin layer can be set freely by selecting the type of foaming agent, controlling the added amount, etc. Preferably, the porous resin layer has a porosity of 30 to 90%. When the porosity exceeds 90%, the diffusion of the electrolyte or the permeation of the oxygen gas during charging/discharging is not be inhibited, but there is a possibility that an internal short circuit occurs because the active material reaches the counter electrode via through holes.

Conversely, when the porosity is less than 30%, the number of through holes is reduced, inhibiting the diffusion of the electrolyte or the permeation of the oxygen gas.

In the following, examples of the present invention are explained in detail. It is to be understood that the present invention is not limited to the examples. Although the examples of the present invention use valve regulated lead-acid batteries, it has been confirmed that the use of a flooded lead-acid battery also gives a good result.

EXAMPLE 1

(i) Production of Negative Electrode

Slits were made in a lead-tin-calcium alloy sheet consisting of 0.08 wt % of calcium, 0.8 wt % of tin and the rest amount of lead, which was then expanded to form squares. Thereby, an expanded grid 1 with a lug portion 1a was produced.

A negative electrode paste was prepared by mixing powdered lead, water, sulfuric acid with a specific gravity of 1.41, powdered carbon (DENKA BLACK), barium sulfate, a lignin derivative and polyester staple fiber at a weight ratio of 1000:115:70:4.1:21:4.1:1, followed by kneading.

The above-obtained expanded grid 1 was filled with the negative electrode paste to form an active material layer 2. Then, a sheet of paste paper 3 made of kraft pulp and reinforcement for preventing the separation of the active material was attached to each side face of the electrode, which was then cured and dried to give a negative electrode 5 as shown in FIGS. 1 and 2.

(ii) Addition of Organic Binder to Active Material Layer at the Right and Left Edge Portions of Negative Electrode Butyl rubber and styrene rubber were mixed at a weight ratio of 97:3. A resin solution was prepared by dissolving 30 parts by weight of the obtained mixed resin in 70 parts by weight of toluene. The right and left edge portions 4 of the negative electrode 5 were respectively immersed in the resin solution. After the active material layer 2 at the edge portion 4 of the negative electrode 5 was impregnated with the resin solution, it was dried at 120° C. to remove toluene. During drying, the organic binder comprising butyl rubber and styrene rubber permeated through the active material layer 2 at the right and left edge portions of the negative electrode 5, and the surface of the active material layer 2 was covered with a film of the organic binder. FIG. 3 shows the negative electrode after impregnation of the organic binder.

(iii) Production of Positive Electrode

Slits were made in a lead-tin-calcium alloy sheet consisting of 0.08 wt % of calcium, 1.2 wt % of tin and the rest amount of lead, which was then expanded to form squares. Thereby, an expanded grid was produced.

A positive electrode paste was prepared by mixing powdered lead, water, sulfuric acid with a specific gravity of 1.41, tin sulfate ($SnSO_4$) and polyester staple fiber with a length of 2 mm and a diameter of 10 μm at a weight ratio of 1000:115:70:10:1, followed by kneading.

The above-obtained expanded grid 6 was filled with the positive electrode paste. Then, a sheet of paste paper made of kraft pulp and reinforcement for preventing the separation of the active material was attached to each side face of the electrode, which was then cured and dried to give a positive electrode 8.

(iv) Assembly of Lead-Acid Battery

Figure 4:
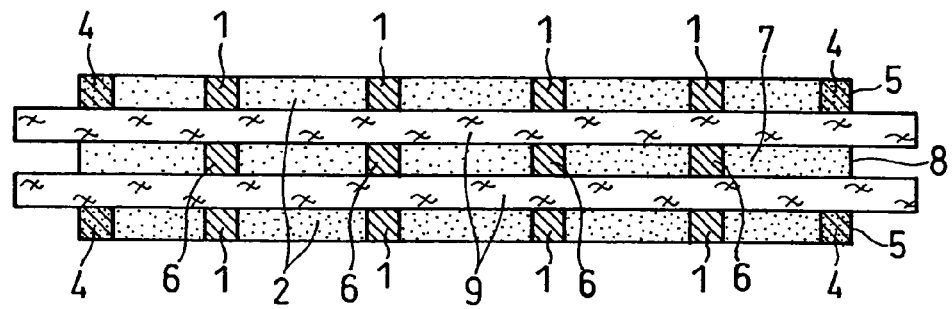
FIG. 4 is a transverse sectional view of a relevant part of a lead-acid battery of Example 1 of the present invention.

There were prepared twelve positive electrodes 8 obtained in the above, thirteen organic binder imparted negative electrodes 5 and twelve glass mat separators 9 obtained by forming glass fiber with a diameter of 3 to 5 μm and one with a diameter of 0.5 to 1.0 μm into a sheet. The aforesaid separator 9 was folded in half and the positive electrode 8 was encased in the folded separator, which was then stacked alternately with the negative electrode. FIG. 4 shows a sectional view of a part of the stack. A strap for collecting currents was formed on the stack by casting to give an electrode assembly. This electrode assembly was inserted into a battery container, and the strap was resistance-welded to connect cells. Then, a battery container lid was provided. Dilute sulfuric acid electrolyte solution with a specific gravity of 1.30 containing 10 g/L of sodium sulfate was poured into the battery container, and a safety valve was provided to obtain a sealed lead-acid battery with a rated voltage of 12 V and a nominal capacity of 65 Ah. This battery was referred to as Battery A.

EXAMPLE 2

A sealed lead-acid battery with a rated voltage of 12 V and a nominal capacity of 65 Ah was produced in the same manner as in Example 1, except that the organic binder was impregnated in the active material layer at the right and left edge portions of the positive electrode using the same method as in Example 1, instead of the negative electrode. The battery was referred to as Battery B.

COMPARATIVE EXAMPLE 1

A sealed lead-acid battery with a rated voltage of 12 V and a nominal capacity of 65 Ah was produced in the same manner as in Example 1, except that the negative electrode did not have the organic binder in the active material layer at the right and left edge portions thereof. The battery was referred to as Battery C.

COMPARATIVE EXAMPLE 2

Eleven positive electrodes, which were the same as those in Comparative Example 1, respectively sandwiched between in a glass mat separators, which were the same as those in Example 1, were produced. Meanwhile, twelve negative electrodes, which were the same as those in Comparative Example 1, respectively encased in bag-shaped non-woven-fabric made of synthetic resin fiber with a thickness of 0.2 mm which was subjected to hydrophilicity treatment were produced. They were alternately stacked to give an electrode assembly. A sealed lead-acid battery with a rated voltage of 12 V and a nominal capacity of 60 Ah was produced in the same manner as in Example 1 using the electrode assembly. The battery was referred to as Battery D.

[Evaluation of Batteries]

Figure 5:
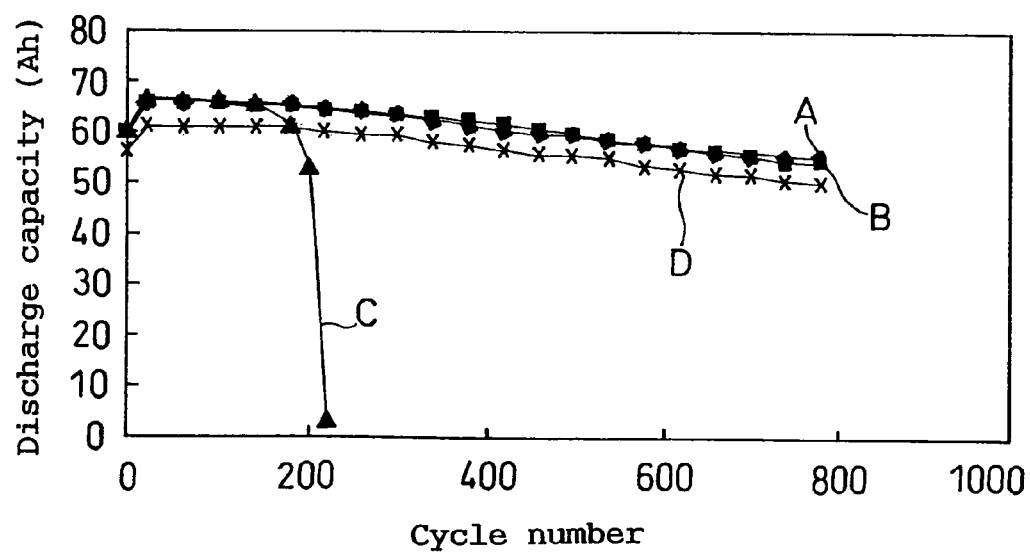
FIG. 5 is a graph showing the relation between the discharge capacity and the cycle number of lead-acid batteries of Examples 1 and 2 of the present invention and Comparative Examples 1 and 2.

Batteries A to D obtained in the above were put through a 1/3 CA discharge cycle life test at 25° C. The discharge was performed at a constant current of 1/3 CA to 80% of discharge depth. The charge was performed at a constant current of 0.2 CA until the battery voltage reached 14.4 V, and after that, at a constant current of 0.05 CA for 4 hours. The charge and the discharge were performed alternately. The batteries were completely discharged at every 20 cycles. Subsequently, their capacities were checked. FIG. 5 shows the evaluation results.

As is apparent from FIG. 5, the capacity of Battery C was remarkably lowered after about 180 cycles and it was below 80% of the initial discharge capacity after 210 cycles. On the other hand, the capacities of Batteries A, B and D were over 90% of the initial discharge capacity even after 800 cycles (Batteries A, B and D had an initial discharge capacity of 61.0, 60.0 and 56.0 Ah respectively and a discharge capacity after 800 cycles of 55.5, 54.0 and 50.6 Ah respectively).

Battery C was disassembled to find that metallic lead deposited on the negative electrode at the side of the electrode assembly and the metallic lead reached the positive electrode, skirting the glass mat separator. This proved that the cause of the remarkable decrease in capacity of Battery C was an internal short circuit.

Battery A was disassembled in the same manner after 800 cycles. The edges of the electrode assembly were checked to prove that the growth of the active material at the right and left edge portions of the negative electrode similar to the case of Battery C was not found. The separation of the active material was found at the right and left edge portions of the positive electrode; however, the amount of the active material separated was small and the separated active material did not extend from the glass mat separator. Presumably, this is because, in the valve regulated lead-acid battery, the stacking pressure of the electrode assembly was high and the active material was sufficiently pressed by glass mat separators.

Battery B was disassembled in the same manner to find that metallic lead extended from the right and left edge portions of the negative electrode, similar to the case of Battery C. However, the organic binder imparted to the right and left edge portions of the positive electrode had no conductivity and the binder formed a film on the surface of the active material. Accordingly, there was no electrical contact. Additionally, the separation of the active material was not found at the right and left edge portions of the positive electrode.

EXAMPLE 3

Figure 6:
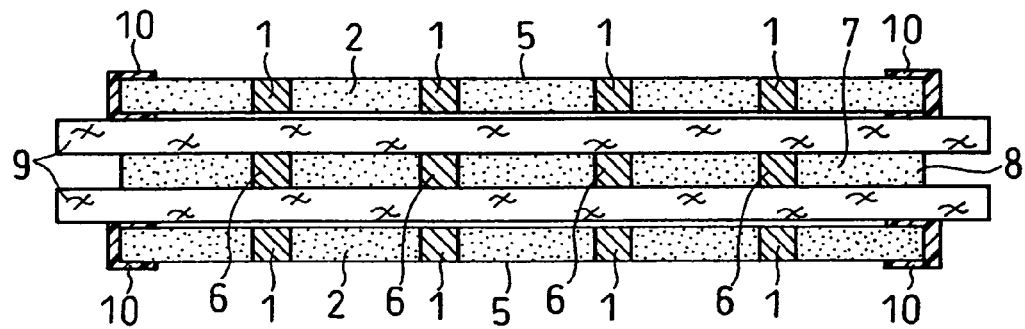
FIG. 6 is a transverse sectional view of a relevant part of a lead-acid battery of Example 3 of the present invention.

FIG. 6 shows a transverse sectional view of a relevant part of the lead-acid battery of the present example.

After a negative electrode 5 was produced in the same manner as in Example 1, a porous resin layer 10 having through holes was formed on the surface of an active material layer 2 at the right and left edge portions 4 of the negative electrode 5 by the following process.

Butyl rubber and styrene rubber were mixed at a weight ratio of 97:3. A resin solution was prepared by dissolving 30 parts by weight of the obtained mixed resin in 70 parts by weight of toluene. In the resin solution was dispersed azodicarbonamide as a foaming agent, and the right and left edge portions of the negative electrode 5 were respectively impregnated with the dispersion. Subsequently, it was foamed at 210° C. and, at the same time, toluene as the solvent was removed therefrom. During this process, part of the resin component permeated the periphery of the surface of the active material layer 2. A porous resin layer 10 with a thickness of 0.05 mm on the surface was formed, and the porous resin layer had a porosity of 55%.

Using the above-obtained negative electrode and positive electrode and glass mat separator which were analogous to those in Example 1, a sealed lead-acid battery with a rated voltage of 12 V and a nominal capacity of 65 Ah was obtained in the same manner as in Example 1. The battery was referred to as Battery E.

EXAMPLE 4

A sealed lead-acid battery with a rated voltage of 12 V and a nominal capacity of 65 Ah was obtained in the same manner as in Example 3, except that the porous resin layer having through holes was formed on the surface of the active material at the right and left edge portions of the positive electrode using the same method as in Example 3, instead of the negative electrode. The battery was referred to as Battery F.

Figure 7:
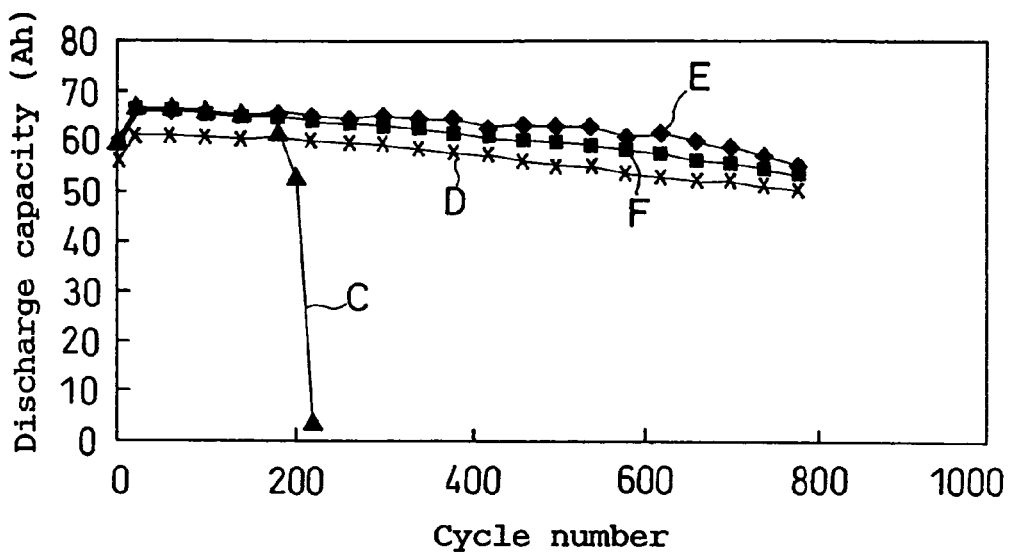
FIG. 7 is a graph showing the relation between the discharge capacity and the cycle number of lead-acid batteries of Examples 3 and 4 of the present invention and Comparative Examples 1 and 2.

Batteries E and F were put through the same cycle life evaluation as in Example 1. FIG. 7 shows the evaluation results. It also shows the results of Batteries C and D for comparison.

FIG. 7 indicated that Batteries E and F respectively maintained a capacity of over 90% of the initial discharge capacity even after 800 cycles. (Batteries E and F had an initial discharge capacity of 61.0 and 60.0 Ah respectively and a discharge capacity after 800 cycles of 55.0 and 54.0 Ah respectively). Batteries E and F were disassembled in the same manner as in Example 1 after 800 cycles to find that Batteries E and F were in the same condition as Batteries A and B.

Figure 8:
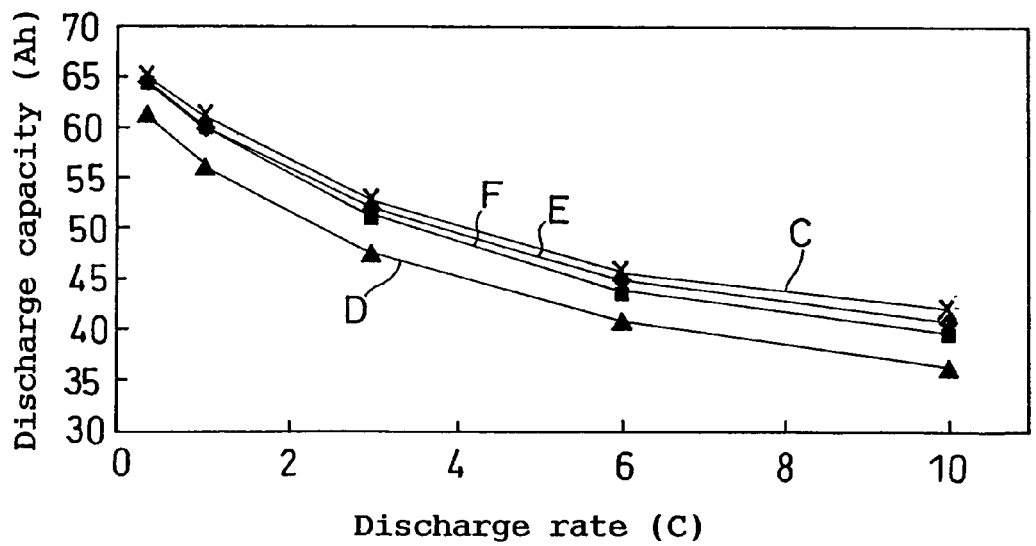
FIG. 8 is a graph showing the relation between the discharge current and the discharge capacity of lead-acid batteries of Examples 3 and 4 of the present invention and Comparative Examples 1 and 2.

Separately from the cycle evaluation, discharge characteristics at the initial state were evaluated. FIG. 8 shows the evaluation results.

FIG. 8 indicated that Batteries E and F had similar discharge characteristics as Battery C and had higher discharge characteristics than Battery D. Presumably, this is because the distance between electrodes of Batteries E and F was smaller by the thickness of the non-woven fabric made of synthetic resin, which reduced the resistance of electrolyte during discharging.

INDUSTRIAL APPLICABILITY

As described above, the present invention can provide a lead-acid battery with longer life by suppressing an internal short circuit resulting from the separation or abnormal growth of an active material due to repeated charge/discharge.

Further, the present invention can provide a lead-acid battery with longer life and good discharge characteristics, without impairing output characteristics, by forming a porous resin layer with through holes on the surface of an active material layer at the edge portion of an electrode.

The invention claimed is:

1. A lead-acid battery comprising a positive electrode and a negative electrode, each having a current collector comprising an expanded grid,
    characterized in that at least one of said positive electrode and negative electrode contains an organic binder in an active material layer, said organic binder being contained only at a circumferential edge portion of said active material layer,
    wherein the organic binder comprises at least one of butyl rubber and styrene rubber.

2. The lead-acid battery in accordance with claim 1, wherein said butyl rubber contains butyl isocyanate.

3. The lead-acid battery in accordance with claim 1, wherein said expanded grid includes at least one hole extending from a first surface to a second surface, said active material layer being included in said at least one hole.

4. The lead-acid battery in accordance with claim 1, said active material layer includes first and second surfaces on opposite sides of said active material layer and a third surface extending from said first surface to said second surface in a thickness direction of said active material layer, said circumferential edge portion including said third surface and only a portion of said first and second surfaces.

5. A lead-acid battery comprising a positive electrode and a negative electrode, each having a current collector comprising an expanded grid,
    characterized in that at least one of said positive electrode and negative electrode has a porous resin layer formed on a side surface of an active material layer, said active material layer includes first and second surfaces on opposite sides of said active material layer and said side surface extends from said first surface to said second surface in a thickness direction of said active material layer, a portion of said porous resin layer formed on said side surface extends from said first surface to said second surface, said porous resin layer being formed only at an edge portion of said active material layer, wherein said edge portion includes said side surface and only a portion of said first and second surfaces.

6. The lead-acid battery in accordance with claim 5, wherein said porous resin layer comprises butyl rubber.

7. The lead-acid battery in accordance with claim 6, wherein said butyl rubber contains butyl isocyanate.

8. The lead-acid battery in accordance with claim 5, wherein said porous resin layer comprises butyl rubber and styrene rubber.

9. The lead-acid battery in accordance with claim 5, wherein said expanded grid includes at least one hole extending from the first surface to the second surface, said active material layer being included in said at least one hole.

* * * * *